(12) United States Patent
Kase et al.

(10) Patent No.: US 7,332,248 B2
(45) Date of Patent: Feb. 19, 2008

(54) ACTIVE MATERIAL FOR POSITIVE ELECTRODE FOR NON-AQUEOUS ELECTROLYTE SECONDARY BATTERY AND METHOD OF MANUFACTURING THE SAME

(75) Inventors: Katsuya Kase, Niihama (JP); Shigeki Kubo, Niihama (JP); Hirofumi Iisaka, Toyota (JP); Ko Nozaki, Toyota (JP); Satoru Suzuki, Kariya (JP); Manabu Yamada, Kariya (JP)

(73) Assignees: Sumitomo Metal Mining Co., Ltd., Tokyo (JP); Toyota Jidosha Kabushiki Kaisha, Tokyo (JP); Denso Corporation, Tokyo (JP)

(*) Notice: Subject to any disclaimer, the term of this patent is extended or adjusted under 35 U.S.C. 154(b) by 0 days.

(21) Appl. No.: 10/739,269

(22) Filed: Dec. 19, 2003

(65) Prior Publication Data
US 2004/0180263 A1    Sep. 16, 2004

(30) Foreign Application Priority Data
Dec. 20, 2002    (JP) .............................. 2002-370985

(51) Int. Cl.
*H01M 4/58*    (2006.01)
(52) U.S. Cl. ................ 429/231.3; 429/231.1; 429/231.6; 429/231.5; 429/223; 429/220; 429/221; 429/224; 429/229; 423/594.4; 423/594.6

(58) Field of Classification Search ............. 429/231.3, 429/223, 231.1, 220, 231.6, 221, 229, 224, 429/231.5; 423/594.4, 594.6
See application file for complete search history.

(56) References Cited

U.S. PATENT DOCUMENTS 5,427,875 A    6/1995    Yamamoto et al.

(Continued)

FOREIGN PATENT DOCUMENTS

EP    0 462 575 A2    12/1991

(Continued)

OTHER PUBLICATIONS

European Search Report issued Apr. 29, 2004 in a related European Patent Application 03 02 9322; 3 pages.

(Continued)

*Primary Examiner*—Laura Weiner
(74) *Attorney, Agent, or Firm*—Finnegan, Henderson, Farabow, Garrett & Dunner, L.L.P.

(57) ABSTRACT

A method of manufacturing a non-aqueous electrolyte secondary battery is provided wherein the positive electrode is made from a lithium-metal composite oxide represented by the general formula $Li_x(Ni_{1-y}, Co_y)_{1-z}M_zO_2$ ($0.98 \leq x \leq 1.10$, $0.05 \leq y \leq 0.4$, $0.01 \leq z \leq 0.2$, in which M represents at least one element selected from the group consisting of Al, Mg, Mn, Ti, Fe, Cu, Zn and Ga), and having an average particle diameter of 5 μm to 10 μm a C-amount of 0.14 wt % or less measured by way of the high-frequency heating-IR absorption method, and a Karl Fischer moisture content of 0.2 wt % or less when heated to 180° C. and the method comprising the steps of applying a paste of active material for positive electrode to electrode plate to make an electrode, then drying the electrode, and pressing and then installing the electrode in a battery, in a work atmosphere having an absolute moisture content of 10 $g/m^3$ or less.

3 Claims, 1 Drawing Sheet

U.S. PATENT DOCUMENTS

| | | | |
|---|---|---|---|
| 5,597,664 A | 1/1997 | Ellgen | 429/224 |
| 6,274,272 B1 * | 8/2001 | Peres et al. | 429/231.1 |
| 6,967,066 B2 * | 11/2005 | Kameyama et al. | 429/231.1 |

FOREIGN PATENT DOCUMENTS

| | | |
|---|---|---|
| EP | 1 143 549 A2 | 10/2001 |
| EP | 1 207 575 A2 | 5/2002 |
| JP | 04032877 | 4/1992 |
| JP | 5-182667 | 7/1993 |

OTHER PUBLICATIONS

Derwent Abstract for JP 5-182667.

* cited by examiner

ACTIVE MATERIAL FOR POSITIVE ELECTRODE FOR NON-AQUEOUS ELECTROLYTE SECONDARY BATTERY AND METHOD OF MANUFACTURING THE SAME

TECHNICAL FIELD OF THE INVENTION

The present invention relates to an active material for positive electrode for non-aqueous electrolyte secondary batteries, non-aqueous electrolyte secondary batteries and a method of manufacturing the material and batteries, and in particular to an active material for positive electrode for non-aqueous electrolyte secondary batteries which allows increased capacity, improved Coulomb efficiency, reduced irreversible capacity (retention), improved output at lout temperature, and improved cycle characteristics in non-aqueous electrolyte secondary batteries, and a method of manufacturing the active material.

DESCRIPTION OF THE PRIOR ART

Lithium ion secondary batteries manifesting high voltage and high energy density while allowing small size and high capacity have become possible in recent years. Thus, the lithium ion secondary batteries are used as a power supply for small mobile equipment including mobile phones, notebook PCs, camcorders, and mobile information terminals and making rapid inroads into society. Furthermore, research and development aimed at use in motor vehicles as represented by hybrid vehicles is currently underway. Within this context, market requirements for batteries of higher capacity with superior safety and excellent output characteristics are increasing.

The most widely used active material for positive electrode for lithium ion secondary batteries is made of a lithium-cobalt composite oxide. Widespread research and development to obtain superior initial capacity and cycle characteristics is currently underway on the lithium ion secondary batteries using this lithium-cobalt composite oxide, so a variety of results have already been obtained, and development of commercial products is proceeding.

However, this lithium-cobalt composite oxide uses an expensive cobalt compound for raw material, increasing the cost of the positive electrode material, and resulting in the higher cost of the secondary battery. Thus, there is a high demand for an inexpensive substitute for the active material for positive electrode.

Research is currently underway on lithium-metal composite oxides wherein the metal is selected from the group of manganese and nickel, as a replacement for the lithium-cobalt composite oxide for active material for positive electrode. In particular, the lithium-nickel composite oxide manifests the same high voltage as the lithium-cobalt composite oxide, and has a theoretical capacity greater than that of the lithium-cobalt composite oxide, and the Ni raw material is less expensive than Co, and available in stable supply. Widespread research and development is therefore underway in expectation of application of the lithium-nickel composite oxide as the next-generation active material ion positive electrode.

Lithium ion secondary batteries, in which lithium-nickel composite oxide obtained with previously proposed methods of manufacture is used as the active material for positive electrode, have a higher charge capacity and discharge capacity, and improved cycle characteristics, in comparison with lithium ion secondary batteries using lithium-cobalt composite oxide as the active material for positive electrode. However they have the disadvantage, although only in the first discharge, that discharge capacity is less in comparison to charge capacity, that the irreversible capacity, or so called "retention" defined by the difference between the charge capacity and discharge capacity is considerable, and that also battery performance is comparatively easily degraded when used in high or low temperature environments.

In order to improve cycle characteristics, a different element may be added for substitution in the lithium-nickel composite oxide (for example, Japanese Patent Publication No. Tokukai Hei 8-78006 discloses the addition of at least one element selected from the group of B, Al, In and Sn, to Li(Ni, Co)$O_2$ composite oxide). While this improves cycle characteristics, it also narrows the range within which intercalation-deintercalation of the lithium ions in the active material for positive electrode is obtained, and tends to reduce discharge capacity. This reduction in discharge capacity is known to be particularly apparent under conditions of high load at high discharge currents, and conditions of high efficiency discharge at low temperatures where lithium ion mobility in electrolyte is reduced at low temperatures.

Output characteristics of secondary batteries at low and/or high temperatures are extremely important when the secondary batteries are installed in equipment used in environments in which temperature variation is large. In particular, if use in cold regions is considered, the second batteries must have sufficient output characteristics required at low temperature. Improvement in the output characteristics at low temperature has therefore been an important matter for consideration when the lithium ion secondary batteries with lithium-nickel composite oxide are installed in motor vehicles. Experiments are therefore being conducted to improve the output characteristics at low temperature.

For example, Japanese Patent Publication No. Tokukai Hei 11-288716 discloses the use of lithium-metal composite oxide, $Li_x(Ni_y, Co_{1-y}) O_2$ (0<x<1.10, 0.75<y<0.90), of active material for positive electrode in which primary particles grow towards the outside of the secondary particles formed by the primary particles in a radial pattern of regular crystal growth, to allow uniform intercalation-deintercalation of lithium ions from the surface of the secondary particles to obtain discharge characteristics at low temperature with high efficiency. However, when using the aforementioned active material for positive electrode, the surface of the active material for positive electrode becomes covered due to conductive material, adhesive, or gas absorbed into the surface of the particles when synthesizing the active material for positive electrode. So, it is considered that the increase in the surface area of active material is limited.

Furthermore, Japanese Patent Publication No. Tokukai 2000-331683 discloses the control of specific surface area, average particle diameter, and average pore diameter to within a specific range to prevent reduction of discharge capacity at low temperatures, and to prevent deterioration in cycle characteristics. However, if one characteristic is given priority, there is a tendency for other characteristics to deteriorate, and this method therefore cannot be considered satisfactory.

Moreover, Japanese Patent Publication No. Tokukai Hei 11-224664 discloses, for example, an use of lithium-metal composite oxide having a structure where Co, Mn, Fe, Mg, Al or the like are uniformly distributed in solid-solution in the crystal structure of lithium-metal composite oxide, such that the surface of fine particles of the lithium-metal composite oxide and/or the surface of a positive electrode containing a material comprising lithium-metal composite oxide in fine particles, are covered with a coating of water-repellent material consisting of at least one type selected from the group of a fluorine-containing polymer compound and an organic silicon compound, in order to prevent deterioration of battery characteristics due to the effects of moisture on the lithium-metal composite oxide in the positive electrode material. Moreover it is disclosed that, the possibility of provision of a lithium ion secondary battery which is superior humidity-resistant and very safe can be provided by performing the operation for positive electrode in a work room provided with dehumidifying equipment such as a dry room. However, since the positive electrode and/or active material for it is covered with a water repellent material, it is difficult due to the effects to intercalation-deintercalation of the lithium ions to achieve high efficiency discharge characteristics.

Additionally, Japanese Patent Publication No. Tokukai 2001-351686 discloses for example, a method of improving low-temperature output characteristics of a secondary battery using active material for positive electrode such as $Li(Ni_{0.8}, Co_{0.15})Al_{0.05}O_2$ or the like wherein, following formation of the battery, charge and discharge is conducted at a maximium charging voltage above the maximum voltage for normal use of the battery, so that the surface area contributing to the reaction of the particles of active material for positive electrode, and so the effective surface area of the positive electrode, are increased to activate the charge and discharge reaction and to improve the low temperature characteristics. However it does not improve the characteristics of the active material for positive electrode itself.

SUMMARY OF THE INVENTION

An object of the present invention is to provide active material for positive electrode for non-aqueous electrolyte secondary batteries so as to provide the non-aqueous electrolyte secondary batteries with high initial discharge current and low irreversible capacity (retention), and with high output characteristics at high and/or low temperatures.

Another object of the present invention is to provide a method of manufacturing such an active material for positive electrode.

DETAILED DESCRIPTION OF THE PREFERRED EMBODIMENT

Figure 1:
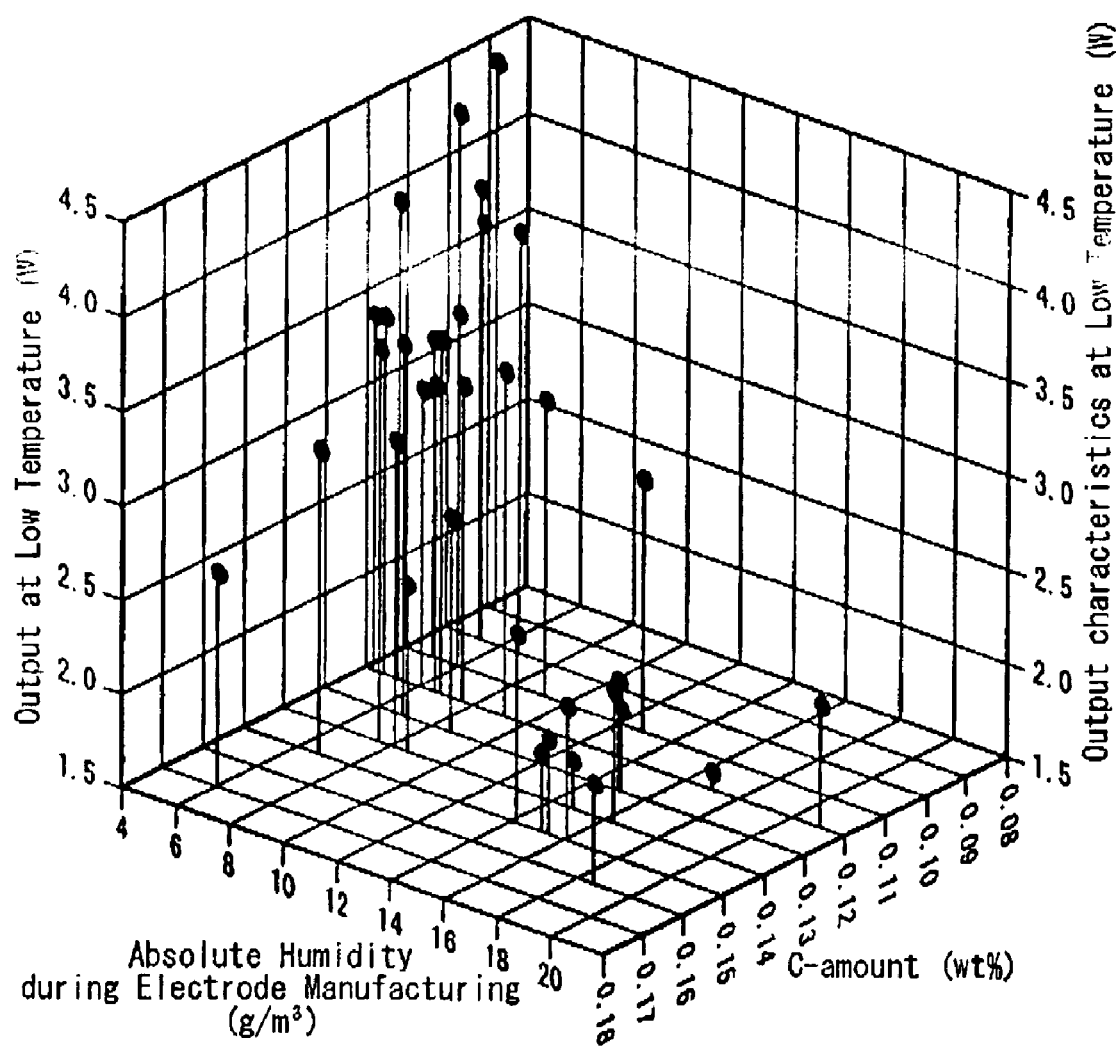
FIG. 1 is a graph to show a relation between the output at low temperature, the C-amount and the absolute humidity in the atmosphere in which electrode in manufactured.

The active material for positive electrode for the non-aqueous electrolyte secondary battery according to one embodiment of the present invention comprises: a lithium-metal composite oxide represented by the general formula $Li_x(Ni_{1-y}, Co_y)_{1-z}M_zO_2$ ($0.98 \leq x \leq 1.10$, $0.05 \leq y \leq 0.4$, $0.01 \leq z \leq 0.2$, in which M represents at least one element selected from the group consisting of Al, Mg, Mn, Ti, Fe, Cu, Zn and Ga), having a C-amount of 0.14 wt % or less. The C-amount is measured by way of the high frequency heating-infrared (IR) absorption method.

According to another embodiment of the present invention, the active material for positive electrode for the non-aqueous electrolyte secondary battery comprises: a lithium-metal composite oxide represented by the general formula $Li_x(Ni_{1-y}, Co_y)_{1-z}M_zO_2$ ($0.98 \leq x \leq 1.10$, $0.05 \leq y \leq 0.4$, $0.01 \leq z \leq 0.2$, in which M represents at least one element selected from the group consisting of Al, Mg, Mn, Ti, Fe, Cu, Zn and Ga), having a Karl Fischer moisture content of 0.2 wt % or less when heated to 180° C.

According to another embodiment of the present invention, the active material for positive electrode for the non-aqueous electrolyte secondary battery comprises: a lithium-metal composite oxide represented by the general formula $Li_x(Ni_{1-y}, Co_y)_{1-z}M_zO_2$ ($0.98 \leq x \leq 1.10$, $0.05y \leq y \leq 0.4$, $0.01 \leq z \leq 0.02$, in which M represents at least one element selected from the group consisting of Al, Mg, Mn, Ti, Fe, Cu, Zn and Ga), having a C-amount of 0.14 wt % or less, and a Karl Fischer moisture content of 0.2 wt % or less when heated to 180° C. The term "C-amount" in the present specification and claims means the total amount of carbon which is contained, deposited, adhered and so on in the lithium-metal composite oxide, and the C-amount is measured by high frequency heating-IR absorption method. This method is disclosed e.g. in "JIS Z 2615, General rules for determination of carbon in metallic materials".

The non-aqueous electrolyte secondary battery of the present invention is prepared by using the aforementioned active material for positive electrode for non-aqueous electrolyte secondary batteries, and assembled in a work atmosphere having an absolute moisture content of 10 g/m³ or less.

According to another embodiment of the present invention, a method of manufacturing a non-aqueous electrolyte secondary battery is provided wherein the positive electrode is made from a lithium-metal composite oxide represented by the general formula $Li_x(Ni_{1-y}, Co_y)_{1-z}M_zO_2$ ($0.98 \leq x \leq 1.10$, $0.05 \leq y \leq 0.4$, $0.01 \leq z \leq 0.2$, in which M represents at least one element selected from the group consisting of Al, Mg, Mn, Ti, Fe, Cu, Zn and Ga), and the method comprises an assembly process which comprises the steps of applying a paste of the active material for positive electrode to an electrode plate for electrodes, then drying the electrodes, pressing and then assembling the electrodes, wherein the assembly process is conducted in a work atmosphere having an absolute moisture content of 10 g/m³ or less.

By controlling the atmosphere of the manufacturing process, the lithium-metal composite oxide has a C-amount of 0.14 wt % or less, and/or a Karl Fischer moisture content of 0.2 wt % or less when heated to 180° C.

Charge and discharge of lithium ion secondary batteries using lithium-metal composite oxide as the active material for positive electrode proceeds by lithium ions reversibly entering and exiting the lithium-metal composite oxide. Since the lithium ions enter and exit lithium-metal composite oxide via the interface between the lithium-metal composite oxide surface and the electrolyte, ease of migration of lithium ions from the lithium-metal composite oxide to the electrolyte has a major effect on battery characteristics. Moreover, ease of migration of lithium ions between this lithium-metal composite oxide and the electrolyte influences the magnitude of the internal resistance of the lithium ion secondary battery, and the lithium ion secondary battery with a high internal resistance could not allow manifestation of satisfactory output characteristics. Since the rate of diffusion of the lithium ions in the electrolyte, and the mobility of migration of lithium ions in the interface between the lithium-metal composite oxide and the electrolyte, are both reduced in low temperature environments in particular, then it is necessary, in order to obtain a lithium ion battery with high output characteristics at low temperatures, to use a lithium-metal composite oxide with low internal resistance at low temperatures, or in other words, a lithium-metal composite oxide wherein migration of lithium ions between the lithium-metal composite oxide and the electrolyte occurs readily.

The inventors of the present invention employed an XPS (ESCALAB220iXL, manufactured by VG) or the like as a means of surface analysis on lithium-metal composite oxide experimentally produced to verify the presence of carbonate ions on the surface of the lithium-metal composite oxide, and furthermore, discovered a correlation between the C-amount and carbonate ions on the surface of the lithium-metal composite oxide, and moreover, discovered a close correlation between the C-amount of the lithium metal composite oxide and the output characteristics at low temperature. The term "C-amount" in the present specification and claims means the total amount of carbon which is contained, deposited, adhered and so on in the lithium-metal composite oxide, and the C-amount is measured by high frequency heating-IR absorption method.

Moreover, the present inventors noticed that it is not always possible only by reducing the concentration of carbonate ions and/or the C-amount to obtain satisfactory output at low temperature, and completed the present invention with the discovery of the fact that the moisture content on the surface of the lithium-metal composite oxide affects the output at low temperature, and the fact that the moisture content of the lithium-metal composite oxide as well as the humidity of the work atmosphere during manufacture of the electrodes must be required.

The following is a detailed description of the present invention.

The active material for positive electrode for the non-aqueous electrolyte secondary battery of the present invention comprises a lithium-metal composite oxide represented by the general formula $Li_x(Ni_{1-y}, Co_y)_{1-z}M_zO_2$ ($0.98 \leq x \leq 1.10$, $0.05 \leq y \leq 0.4$, $0.01 \leq z \leq 0.2$, in which M represents at least one element selected from the group consisting of Al, Mg, Mn, Ti, Fe, Cu, Zn and Ga) having an average particle diameter of 5 μm to 10 μm, a C-amount of 0.14 wt % or less, and/or a Karl Fischer moisture content of 0.2 wt % or less when heated to 180° C. The active material for positive electrode of the present invention is made of a lithium-metal composite oxide, enabling a non-aqueous electrolyte secondary battery having a high initial discharge capacity and low irreversible capacity (retention), as well as high output characteristics at low and/or high temperature.

With the present invention, improvements in the diffusion rate of lithium ions in the electrolyte, and in the mobility of lithium ions at the interface between the electrolyte and active material for positive electrode can be achieved at high and low temperatures.

The present invention is, however, apparently effective at low temperatures because the diffusion rate and mobility are inclined to decrease at low-temperatures.

In the lithium-metal composite oxide of the present invention, nickel ensures the battery characteristics of the lithium-metal composite oxide, and cobalt contributes to improvement of cycle characteristics. If the amount (y) of the added cobalt is outside the range of $0.05 \leq y \leq 0.4$, sufficient cycle characteristics could not be obtained and also the capacity maintenance factor is reduced in the battery. In particular, if y exceeds 0.4, the initial discharge capacity of the battery is significantly reduced, and an increase in the amount of expensive cobalt is not practical in terms of cost.

The metallic element M of the lithium-metal composite oxide of the present invention, that is at least one element selected from the group consisting of Al, Mg, Mn, Ti, Fe, Cu, Zn and Ga must be uniformly dispersed within the lithium-metal composite oxide to ensure a stable crystal structure of the lithium-metal composite oxide. If z is less than 0.01, a stable crystal structure could not be recognized, and z exceeds 0.2, a stable crystal structure develops, however this results in an undesirably significant reduction in initial discharge capacity of the battery.

The desirable average particle diameter of the lithium metal composite oxide of the present invention is 5 μm to 15 μm. If the average particle diameter is less than 5 μm, the specific surface area increases, and when used in a battery, a rapid and dangerous reaction may occur at charge and discharge. Moreover, the tap density of the positive electrode material is reduced, leading to an undesirable reduction in discharge capacity per unit area. On the other hand, if the average particle diameter exceeds 15 μm, particles are excessively large and hence the electrolyte may be unable to reach the interior of the particles, and Li is unable to properly disperse within the particles at charge and discharge, thus tending to reduce the utilization factor. Furthermore, there is also the problem that particles are easily cracked when manufacturing the positive electrode plates, preventing an increase in battery density.

Here, measurement of average particle diameter is performed using a particle size analyzer by Laser diffraction analysis (Microtrac particle size analyzer).

The C-amount of the lithium-metal composite oxide of the present invention is 0.14 wt % or less, and/or the Karl Fischer moisture content is 0.2 wt % or less when heated to 180° C. If the C-amount exceeds 0.14 wt %, the output at low temperature of the battery produced with the lithium-metal composite oxide is reduced, and this is undesirable. Moreover, if the Karl Fischer moisture content when heated to 180° C. exceeds 0.2 wt %, the output at low temperature of the battery produced with the lithium-metal composite oxide is also reduced, and this is undesirable. Carbon is unavoidably present on the surface of the lithium-metal composite oxide in the form of lithium carbonate.

Here the C-amount is measured using the high-frequency combustion-infrared absorption method. Furthermore, the Karl Fischer moisture content when heated to 180° C. indicates that the sample is heated at the temperature of 180° C. and then moisture content of the sample is measured with the Karl Fischer method.

A Transmission Electron Microscope (TBM, HF-2200 manufactured by Hitachi Ltd.) was used for analysis of the structure of the surface of the particles of the lithium-metal composite oxide of the present invention, and no changes in crystal structure of the surface of the particles due to differences in the C-amount or moisture content were recognized.

Possible reasons for the correlation seen between the C-amount of the lithium-metal composite oxide and the output at low temperature are as follows.

If lithium carbonate is present on the surface of the lithium-metal complex oxide, then at the time of battery reaction, in particular at discharge, this covers the entry and exit points of lithium ions in the surface of the lithium-metal composite oxide, in other words a cross section perpendicular to the c-axis of crystal structure exposed on the particle surface (a cross section through a layered structure comprising an Ni layer, an O layer and an Li layer), becoming one cause of inhibited entry and exit of lithium ions. This has significant effects on initial discharge capacity, irreversible capacity (retention), the output at high temperature, and/or low temperature and the like, and is considered a particular cause of reduced output at low temperature.

The presence of carbonate ions on the surface of lithium-metal composite oxide manufactured by the conventional method was verified using the XPS or the like as a means of surface analysis. It is presumed that the majority of these carbonate ions are present in the form of lithium carbonate. This is considered to be a product of the following reactions between lithium oxide or lithium hydroxide, which was part of the lithium salts used as the raw material, and remained, due to non-reaction with the metallic compounds of nickel, cobalt and the metallic element M, after the sintering synthesis was finished, and carbon dioxide gas in the air on the surface or the vicinity.

$$Li_2O + CO_2 \rightarrow Li_2CO_3 \quad (1)$$

$$Li_2O + H_2O \rightarrow LiOH \quad (2)$$

$$2LiOH + CO_2 \rightarrow Li_2CO_3 + H_2O \quad (3)$$

$$LiNiO_2 + H_2O \rightarrow xNiOOH + (1-x)LiNiO_2 + xLiOH \quad (4)$$

Moreover, when moisture is present in the vicinity of the surface of the lithium-metal composite oxide, the lithium-metal composite oxide itself reacts with the moisture as shown in the reaction formula (4), producing LiOH which then produces lithium carbonate in accordance with the reaction formula (3).

Furthermore, as the reaction formula (2) proceeds more rapidly than the reaction formula (1), if carbon dioxide gas and moisture are present in the atmosphere, denaturation of lithium oxide to an hydroxide as in the reaction formula (2) occurs more readily than carbonation of the lithium oxide present on the surface. As a result, moisture present in the atmosphere promotes carbonation of the lithium-metal composite oxide.

Therefore, in the method of manufacturing the active material for positive electrode for the non-aqueous electrolyte secondary battery according to the present invention, when lithium-metal composite oxide as represented by the general formula $Li_x(Ni_{1-y}, Co_y)_{1-z}M_zO_2$ ($0.98 \leq x \leq 1.10$, $0.05 \leq y \leq 0.4$, $0.01 \leq z \leq 0$, in which M represents at least one element selected from the group consisting of Al, Mg, Mn, Ti, Fe, Cu, Zn, and Ga) is synthesized from lithium compounds, nickel compounds, cobalt compounds, and metallic element M compounds via a blending step, a firing step, a crushing step, a sieving step, and a classification step, it is desirable that the crushing step, sieving step, and classification step are conducted in a dehumidified atmosphere and it is more desirable that the work atmosphere with which the battery components are in contact contains no carbon dioxide gas. In particular, strict control of carbon dioxide gas and moisture in the crushing step and sieving step is required. It is desirable that the atmosphere also be controlled for transport and packing steps and the like.

Moreover, since the aforementioned reactions may occur not only in the manufacture of lithium-metal composite oxide, but in all processes from battery assembly to sealing, the atmosphere is controlled for all the processes including; the steps wherein a conduction aid and a paste solvent are kneaded together with the lithium-metal composite oxide which is the active material for positive electrode, wherein the kneaded one is applied to the positive electrode plates, wherein the positive electrode plates are pressed, and wherein the positive electrode plates and negative electrode plates are joined and installed into the battery case, which is then sealed. In detail, assembly and manufacture are required to be conducted in a work atmosphere with an absolute moisture content of 10 g/m³ or less.

Employed as the active material for positive electrode in the method of manufacturing a non-aqueous electrolyte secondary battery according to the present invention, is a lithium-metal composite oxide represented by the general formula:

$$Li_x(Ni_{1-y}Co_y)_{1-z}M_zO_2 \ (0.98 \leq x \leq 1.10, 0.05 \leq y \leq 0.4, 0.01 \leq z \leq 0.2),$$

in which M represents at least one element selected from the group consisting of Al, Mg, Mn, Ti, Fe, Cu, Zn and Ga). The work atmosphere with which the battery components are in contact in the assembly step has an absolute moisture content of 10 g/m³ or less.

By controlling the atmosphere of the manufacturing-step, the lithium-metal composite oxide can have a C-amount of 0.14 wt % or less, and/or a Karl Fischer moisture content of 0.2 wt % or less when heated to 180° C.

EXAMPLES

Examples 1

170 g of spherical composite nickel hydroxide with an Ni grade of 50.5 wt %, a Co grade of 8.5 wt %, and an Al grade of 1.0 wt % was blended with 80 g of commercially available powdered lithium hydroxide monohydrate, fired at 250° C. for four hours, 450° C. for nine hours, and 730° C. for 22 hours, and then cooled at room temperature.

The resulting fired product was crushed in a pin mill in a nitrogen atmosphere, and sieved in the same nitrogen atmosphere using a 25 µm ultrasonic vibrating strainer to remove plus-mesh particles. Furthermore, particles of 1 µm or less were removed from the obtained minus-mesh particles using a wind classifier in dehumidified air (temperature 15° C., humidity 30%), and dried in a vacuum for 24 hrs at 150° C.

Analysis of the obtained lithium-metal composite oxide using X ray diffraction verified that it was the desired active material for positive electrode with a hexagonal crystal layer structure. The C-amount measured using the high-frequency combustion-infrared absorption method according to JIS Z 2615 was 0.09 wt % to 0.12 wt %, and the Karl Fischer moisture content when heated to 180° C. was 0.03 wt % to 0.05 wt %.

The C-amount for the lithium-metal composite oxide in Example 1 measured by the high-frequency heating-IR adsorption method is shown in Table 1.

The battery described below was manufactured using the obtained lithium-metal composite oxide, and the charge and discharge capacity, and the output characteristics at −30° C. were measured.

Active material in powder form of 90 wt % was mixed with acetylene black of 5 wt %, and PVDF (polyvinylidene fluoride) of 5 wt %, and NMP (n-methylpyrrolidone) added to form a paste. This paste was applied to 20 µM thick aluminum foil such that the active material weight after drying was 0.05 g/cm², dried in a vacuum at 120° C., and formed into positive electrodes by punching out the aluminum foil with paste into disks of 1 cm diameter. A lithium metal negative electrode and an electrolyte consisting of a solution of ethylene carbonate (EC) and diethylcarbonate (DEC) blended in equivalent volume with a 1M LiClO₄ used for a supporting salt, were used in the manufacture of a 2032 type coin battery, in a glove box containing an argon atmosphere with a dew-point temperature controlled to −80° C. or lower.

The manufactured battery was left for approximately 24 hrs, and after the OCV (open circuit voltage) had stabilized, current density for the positive electrodes was set to 0.5 mA/cm², and charge and discharge testing conducted at 25° C. and −30° C. at a cut-off voltage of 4.3V to 3.0V Irreversible capacity (retention) and coulomb efficiency were calculated as shown below. Moreover, the output at low temperature was calculated by integrating the first discharge curve at −30° C.

Retention=First charge capacity−first discharge capacity (mAh/g)

Coulomb efficiency=First discharge capacity/first charge capacity×100(%)

Measurements of absolute humidity of the atmosphere in which the electrode was manufactured, initial battery capacity, and output at low temperature of −30° C., are shown in Table 1.

Example 2

Apart from the fact that the steps of crushing in a pin mill, sieving particles in a 25 μm ultrasonic vibrating strainer to remove plus-mesh particles, and removing particles of 1 μm or less using a wind classifier, were performed in dehumidified air, the lithium-metal composite oxide was obtained with substantially the same method as in Example 1.

The C-amount of the obtained lithium-metal composite oxide was 0.12 wt % to 0.14 wt %, measured by way of the high-frequency beating-IR adsorption method, and the Karl Fischer moisture content when heated to 180° C. was 0.03 wt % to 0.06 wt %.

Using the obtained lithium-metal composite oxide, the battery was manufactured with substantially the same method as in Example 1, and the characteristics of the battery were measured.

The results of measurements of the C-amount of the lithium-metal composite oxide, the absolute humidity of the atmosphere in which the electrode was manufactured, the output of the battery at low temperature of −30° C., and the initial capacity, are shown for Example 2 in Table 1.

Comparative Example 1

Apart from the fact that the steps of crushing particles in a pin mill, sieving in a 25 μm ultrasonic vibrating strainer to remove plus-mesh particles, and conducting wind classification, were performed in a normal atmosphere without dehumidification, the lithium-metal composite oxide was obtained with the substantially same method as in Example 1.

The C-amount of the obtained lithium-metal composite oxide was 0.12 wt % to 0.17 wt %, measured by way of the high-frequency heating-IR adsorption method, and the Karl Fischer moisture content when heated to 180° C. was 0.04 wt % to 0.10 wt %.

Using the obtained lithium-metal composite oxide, the battery was manufactured with substantially the same method as in Example 1, and the characteristics of the battery were measured.

The results of measurements of the C-amount of the lithium-metal composite oxide, the absolute humidity of the atmosphere in which the electrode was manufactured, the output of the battery at low temperature of −30° C., and the initial capacity, are shown for Comparative Example 1 in Table 1.

Comparative Example 2

A fired product was obtained with the substantially same method as in Example 1. Apart from the fact that a normal atmosphere is used for manufacturing, the battery was manufactured using this fired product with the substantially same method as in Example 1, and the characteristics of the battery were measured.

The C-amount measured using the high-frequency heating-infrared absorption method was 0.11 wt % to 0.13 wt %, and the Karl Fischer moisture content when heated to 180° C. was 0.04 wt % to 0.13 wt %, for the obtained fired product.

The results of measurements of the C-amount of the lithium-metal composite oxide, the absolute humidity of the atmosphere in which the electrode was manufactured, the output of the battery at low temperature of −30° C., and the initial capacity, are shown for Comparative Example 2 in Table 1.

Comparative Example 3

A fired product was obtained with the substantially same method as in Example 2. Apart from the fact that in a normal atmosphere is used for manufacturing, the battery was manufactured using this fired product with the same method as in Example 1, and the characteristics of the battery were measured.

The C-amount measured using the high-frequency heating-infrared absorption method was 0.14 wt % to 0.16 wt %, and the Karl Fischer moisture content when heated to 180° C. was 0.04 wt % to 0.21 wt %, for the obtained fired product.

The results of measurements of the C-amount of the lithium-metal composite oxide, the absolute humidity of the atmosphere in which the electrode was manufactured, the output of the battery at low temperature of −30° C., and the initial capacity, are shown for Comparative Example 3 in Table 1.

Comparative Example 4

Apart from the fact that the steps of crushing in a pin mill, sieving using a 25 μm ultrasonic vibrating strainer to remove plus-mesh particles, and conducting wind classification, were performed in dehumidified air, and apart from the fact that the steps of vacuum-drying the particles in a vacuum drier at 150° C. for 24 hrs, and then introducing steam generated from 0.3 g of deionized water into the vacuum drier, and keeping the particles for 24 hrs at 80° C., the lithium-metal composite oxide was obtained with the substantially same method as in Example 1.

The C-amount measured using the high-frequency heating-infrared absorption method was 0.11 wt % to 0.14 wt %, and the Karl Fischer moisture content when heated to 180° C. was 0.20 wt % to 0.22 wt %, for the obtained lithium-metal composite oxide.

Using the obtained lithium-metal composite oxide, a battery was manufactured with substantially the same method as in Example 1, and the characteristics of the battery were measured.

The results of measurements of the C-amount of the lithium-metal composite oxide, the absolute humidity of the atmosphere in which the electrode was manufactured, the output of the battery at low temperature of −30° C., and the initial capacity, are shown for Comparative Example 4 in Table 1.

It was found that, when the lithium-metal composite oxide was manufactured under conditions in which only moisture content was increased with the C-amount in the active material for positive electrode kept low, output at low temperature and initial capacity were reduced despite the atmosphere in which the electrode was manufactured being the substantially same as for the Examples 1 and 2.

more, output at low temperature of 4.5 W or more could not be obtained, irrespective of the C-amount.

As is apparent from the results noted above, lithium-metal composite oxide having a C-amount of 0.14 wt % or less, and an absolute humidity of the work atmosphere in which the battery is manufactured of 10 g/m$^3$ or less, are desirable in order to manifest satisfactory output characteristics at low

TABLE 1

|  | C-amount (wt %) | Karl Fischer Moisture Content (wt %) | Absolute Humidity of Atmosphere in which Electrode was Manufactured (g/m$^3$) | Output at Low Temperature (W) | Initial Capacity (mAh/g) |
| --- | --- | --- | --- | --- | --- |
| Example 1 | 0.12 | 0.05 | 5.2 | 4.03 | 168.2 |
|  | 0.09 | 0.04 | 4.3 | 4.39 | 163.5 |
|  | 0.10 | 0.05 | 4.4 | 3.18 | 161.1 |
|  | 0.10 | 0.04 | 5.3 | 3.70 | 165.8 |
|  | 0.10 | 0.05 | 5.2 | 3.88 | 166.8 |
|  | 0.10 | 0.03 | 6.7 | 3.72 | 166.7 |
|  | 0.11 | 0.04 | 5.0 | 3.18 | 166.7 |
|  | 0.11 | 0.05 | 5.9 | 4.42 | 163.3 |
| Example 2 | 0.12 | 0.05 | 6.1 | 3.08 | 159.7 |
|  | 0.14 | 0.06 | 8.1 | 3.12 | 164.8 |
|  | 0.13 | 0.04 | 8.7 | 3.04 | 165.7 |
|  | 0.12 | 0.03 | 4.7 | 3.40 | 166.5 |
|  | 0.12 | 0.03 | 4.3 | 3.38 | 166.9 |
|  | 0.12 | 0.04 | 7.6 | 3.18 | 164.3 |
| Comparative Example 1 | 0.15 | 0.05 | 6.8 | 3.12 | 166.5 |
|  | 0.14 | 0.09 | 7.5 | 3.58 | 165.5 |
|  | 0.14 | 0.06 | 8.6 | 2.39 | 158.7 |
|  | 0.17 | 0.10 | 6.1 | 2.64 | 164.8 |
|  | 0.12 | 0.05 | 6.8 | 3.38 | 165.5 |
|  | 0.13 | 0.04 | 6.9 | 3.46 | 165.2 |
|  | 0.12 | 0.04 | 6.6 | 3.13 | 163.8 |
| Comparative Example 2 | 0.13 | 0.07 | 15.1 | 1.94 | 159.0 |
|  | 0.12 | 0.13 | 17.0 | 1.60 | 160.5 |
|  | 0.13 | 0.05 | 15.0 | 2.09 | 162.9 |
|  | 0.12 | 0.07 | 21.1 | 2.16 | 162.9 |
|  | 0.11 | 0.07 | 9.2 | 3.07 | 165.1 |
|  | 0.12 | 0.04 | 9.2 | 3.33 | 164.5 |
|  | 0.11 | 0.05 | 12.9 | 2.84 | 164.9 |
| Comparative Example 3 | 0.14 | 0.07 | 16.3 | 2.20 | 163.0 |
|  | 0.15 | 0.08 | 16.1 | 2.22 | 163.4 |
|  | 0.16 | 0.21 | 18.6 | 2.04 | 162.7 |
|  | 0.15 | 0.09 | 15.4 | 2.01 | 165.2 |
|  | 0.15 | 0.05 | 15.1 | 1.92 | 166.8 |
|  | 0.14 | 0.12 | 14.8 | 1.76 | 163.7 |
|  | 0.15 | 0.04 | 14.2 | 2.51 | 164.6 |
| Comparative Example 4 | 0.11 | 0.20 | 5.2 | 2.51 | 163.2 |
|  | 0.13 | 0.21 | 4.8 | 1.99 | 164.5 |
|  | 0.12 | 0.20 | 5.3 | 2.13 | 162.2 |
|  | 0.14 | 0.22 | 6.1 | 1.87 | 164.7 |
|  | 0.12 | 0.21 | 5.7 | 2.25 | 167.1 |

Furthermore, the relationship between the C-amount and the absolute humidity of the atmosphere in which the electrode was manufactured, and output at low temperature, is shown in FIG. 1.

From FIG. 1, it is apparent that when the absolute humidity of the atmosphere in which the electrode is manufactured is 10 g/m$^3$ or less, there is a negative correlation between the C-amount of lithium-metal composite oxide and the output at low temperature, and that a C-amount of 0.14 wt % or less is required in order to have the output at low temperature of 3 W or more.

Moreover, it is apparent that when compared with lithium-metal composite oxide of the same C-amount, a high absolute humidity of the atmosphere in which the electrode is manufactured results in a reduction in output at low temperature, and when absolute humidity was 10 g/m$^3$ or temperature. Furthermore, for this reason, an atmosphere free of carbon dioxide gas and moisture such as a nitrogen atmosphere, is required for at least the crushing steps and sieving steps following the firing step.

Use of the lithium-metal composite oxide of the present invention obtained by control of the C-amount to 0.14 wt % or less, and/or the Karl Fischer moisture content to 0.2 wt % or less when heated to 180° C., as a active material for positive electrode in a non-aqueous electrolyte secondary battery provides a secondary battery of high capacity and excellent output at low temperature.

Moreover, manufacture of the battery while controlling the absolute humidity of the work atmosphere to 10 g/m$^3$ or less provides a secondary battery of high capacity and excellent output characteristics at low temperature.

What is claimed is:

1. An active material for a positive electrode of a non-aqueous electrolyte secondary battery, comprising: a lithium-metal composite oxide represented by the general formula $Li_x(Ni_{1-y}Co_y)_{1-z}M_zO_2$, wherein x ranges from 0.98 to 1.10, y ranges from 0.05 to 0.4, and z ranges from 0.01-0.2, and M represents at least one element selected from the group consisting of Al, Mg, Mn, Ti, Fe, Cu, Zn and Ga, and said active material is manufactured from lithium hydroxide and composite nickel hydroxide via a blending step, a firing step, a crushing step, a sieving step, and a classification step, wherein the crushing step, the sieving step, and the classification step are conducted in a controlled atmosphere, such that carbon is unavoidably present on the surface of the lithium-metal composite oxide in the form of lithium carbonate, wherein the amount of carbon is 0.14 wt % or less, as measured by the high-frequency heating-IR absorption method, and when said active material is incorporated into a 2032 type coin battery, said battery exhibits improved initial discharge capacity of 159.7 mAh/g or more and output at low temperature of −30° C. of 3W or more.

2. The active material of claim 1, wherein said lithium-metal composite oxide has a Karl Fischer moisture content of 0.2 wt % or less when heated to 180° C.

3. A non-aqueous electrolyte secondary battery comprising the active material of any one of claims 1 and 2, wherein said secondary battery is assembled in a work atmosphere having an absolute moisture content of 10 $g/m^3$ or less, and having initial discharge capacity of 159.7 mAh/g or more and output at low temperature of −30° C. of 3W or more, when this non-aqueous electrolyte secondary battery is a 2032 type coin battery.

* * * * *